(12) United States Patent
Rahman et al.

(10) Patent No.: US 6,864,646 B2
(45) Date of Patent: Mar. 8, 2005

(54) MULTIPLE INVERTER SYSTEM WITH LOW POWER BUS RIPPLES AND METHOD THEREFOR

(75) Inventors: Khwaja M. Rahman, Torrance, CA (US); Silva Hiti, Redondo Beach, CA (US); Scott D. Downer, Torrance, CA (US); Brian Welchko, Madison, WI (US)

(73) Assignee: General Motors Corporation, Detroit, MI (US)

( * ) Notice: Subject to any disclaimer, the term of this patent is extended or adjusted under 35 U.S.C. 154(b) by 67 days.

(21) Appl. No.: 10/367,201

(22) Filed: Feb. 14, 2003

(65) Prior Publication Data

US 2004/0160201 A1 Aug. 19, 2004

(51) Int. Cl.[7] .............................. H02P 7/68; H02P 7/74; G05B 19/18; G05B 11/01
(52) U.S. Cl. ................................ 318/41; 700/2; 700/3; 700/19; 700/20
(58) Field of Search ...................... 318/41–44, 255–279, 318/34, 53, 59, 66, 73, 78, 85, 139, 801, 811; 700/2, 3, 19, 20

(56) References Cited

U.S. PATENT DOCUMENTS

| | | | | |
|---|---|---|---|---|
| 4,284,936 A | * | 8/1981 | Bailey et al. ............... 318/381 |
| 4,853,602 A | * | 8/1989 | Hommes et al. ............... 318/38 |
| 6,011,367 A | * | 1/2000 | Oedl et al. ..................... 318/38 |
| 6,078,173 A | | 6/2000 | Kumar et al. ............ 324/158.1 |
| 6,118,235 A | * | 9/2000 | Redlich ....................... 318/135 |
| 6,208,540 B1 | | 3/2001 | O'Meara et al. .............. 363/98 |
| 6,262,896 B1 | | 7/2001 | Stancu et al. .................. 363/17 |
| 6,281,645 B1 | * | 8/2001 | Matsukawa ................. 318/112 |
| 6,362,585 B1 | | 3/2002 | Hiti et al. .................... 318/430 |
| 6,625,498 B1 | * | 9/2003 | Kurakake et al. .............. 700/3 |
| 6,742,630 B2 | * | 6/2004 | Eilinger ...................... 187/290 |
| 2004/0080296 A1 | * | 4/2004 | Mir et al. .................... 318/701 |

* cited by examiner

*Primary Examiner*—David Martin
*Assistant Examiner*—Patrick Miller
(74) *Attorney, Agent, or Firm*—Christopher DeVries

(57) ABSTRACT

A multiple inverter system is powered from a common energy source such as a battery. First and second inverters are coupled to the common energy source and drive corresponding motors. First and second controllers provide pulse width modulated signals, modulated with respect to first and second clock signals, respectively, to the respective first and second inverters. A capacitor coupled between a power bus and a ground bus smoothes power bus ripples caused by simultaneous switching. To reduce the size needed for the capacitor, different modulation schemes, such as center based interleaved, and leading and lagging edge coincident, are used when both motors are in the motoring mode or both motors are in the regeneration mode. However, the same modulation scheme is used when one motor is in the motoring mode and the other motor is in the regeneration mode.

16 Claims, 4 Drawing Sheets

US 6,864,646 B2

MULTIPLE INVERTER SYSTEM WITH LOW POWER BUS RIPPLES AND METHOD THEREFOR

TECHNICAL FIELD

This invention relates generally to electrical motors, and more particularly to systems employing multiple electrical motors powered from a common power supply.

BACKGROUND OF THE INVENTION

Electric vehicles, including battery, hybrid, and fuel cell electric vehicles, typically use an inverter in the form of a switch-mode power supply to provide three phase operating power to the vehicle's electric drive motor. The inverter design most commonly used is a pulse width modulated (PWM) voltage source inverter which utilizes power transistors that can supply the high currents needed to satisfy the torque demands required by the vehicle drive motor. The inverter switches power to the motor windings from a direct current (dc) bus. For a low voltage system, the dc bus is typically 42V, while for a high voltage system the dc bus is approximately 350–400 volts (Vdc).

When different phases of the inverter switch, they cause significant fluctuations in the power supply voltage. Collectively, these fluctuations are known as power bus voltage and current ripples. Typically large capacitors or capacitor banks connected in parallel to the direct current (DC) power supply are used to compensate for power bus ripples by functioning as a smoothing filter. The size of the capacitor bank in an automotive inverter system depends on the bus voltage, power level, and the ripple tolerance of the system. In the automotive environment when driving an inverter from a high voltage bus, a capacitor of 1000 micro Farads ($\mu F$) or larger may be required to smooth the voltage ripple sufficiently. The amount of capacitance can be in excess of 16,000 $\mu F$ for a low voltage system, such as a 42V system. A capacitor or capacitor bank having a value this high requires a significant amount of space and increases vehicle cost.

Power bus ripples are higher for multiple inverter systems. Multiple inverter systems are systems with two or more inverters that drive a corresponding number of motors but are powered from the same energy source. For example, in hybrid vehicles dual inverter systems may be used for the transmission system or for the traction system. The power bus ripple problem is compounded in multiple inverter systems because the ripple is additive. Thus, in order to power both inverter systems from the same power supply, it is necessary to provide a larger capacitor than would be required for a single inverter system alone. It would be desirable to have a multiple inverter system that requires a smaller capacitor to provide a given degree of smoothing. Such an inverter system is provided by the present invention, whose features and advantages will be more clearly understood from the following detailed description taken in conjunction with accompanying drawings.

SUMMARY OF THE INVENTION

Accordingly, the present invention provides, in one form, a multiple inverter system for a vehicle comprising an energy source and a capacitor coupled in parallel to the energy source. A first inverter is coupled to the energy source and is adapted to drive a first motor. A first controller has an output coupled to the first inverter and provides a first pulse width modulated signal thereto that is modulated in relation to a first clock signal. A second inverter is coupled to the energy source and is adapted to drive a second motor. A second controller has an input for receiving a synchronization signal, and an output coupled to the second inverter for providing a second pulse width modulated signal thereto that is modulated in relation to a second clock signal. The second controller uses the synchronization signal to generate the second clock signal having a predetermined relationship with respect to the first clock signal.

In another form, the present invention provides a method for reducing the power bus ripples of a multiple inverter system. First and second inverters respectively coupled to first and second motors are powered from a common power source. A first pulse width modulated signal that is modulated in relation to a first clock signal is generated, and the first inverter is driven with the first pulse width modulated signal. A second pulse width modulated signal that is modulated in relation to a second clock signal is generated, and the second inverter is driven with the second pulse width modulated signal. The first and second clock signals are generated having a predetermined relationship with respect to each other.

In yet another form, the present invention also provides a method for reducing the power bus ripples of a multiple inverter system. First and second inverters respectively coupled to first and second motors are powered from a common energy source. The first inverter is driven using a first pulse width modulation signal. The second inverter is driven using a second pulse width modulation signal. The first and second pulse width modulation signals are generated using the same modulation scheme when one of the first and second motors is in a motoring mode and the other one of the first and second motors is in a regeneration mode. The said first and second pulse width modulation signals are generated using different modulation schemes when either, both the first and second motors are in the motoring mode, or both the first and second motors are in the regeneration mode.

BRIEF DESCRIPTION OF THE DRAWINGS

The present invention will hereinafter be described in conjunction with the following drawing figures, wherein like numerals denote like elements, and.

DESCRIPTION OF THE PREFERRED EMBODIMENT

The following detailed description of the invention is merely exemplary in nature and is not intended to limit the invention or the application and uses of the invention.

Furthermore, there is no intention to be bound by any theory presented in the preceding background of the invention or the following detailed description of the drawings.

Figure 1:
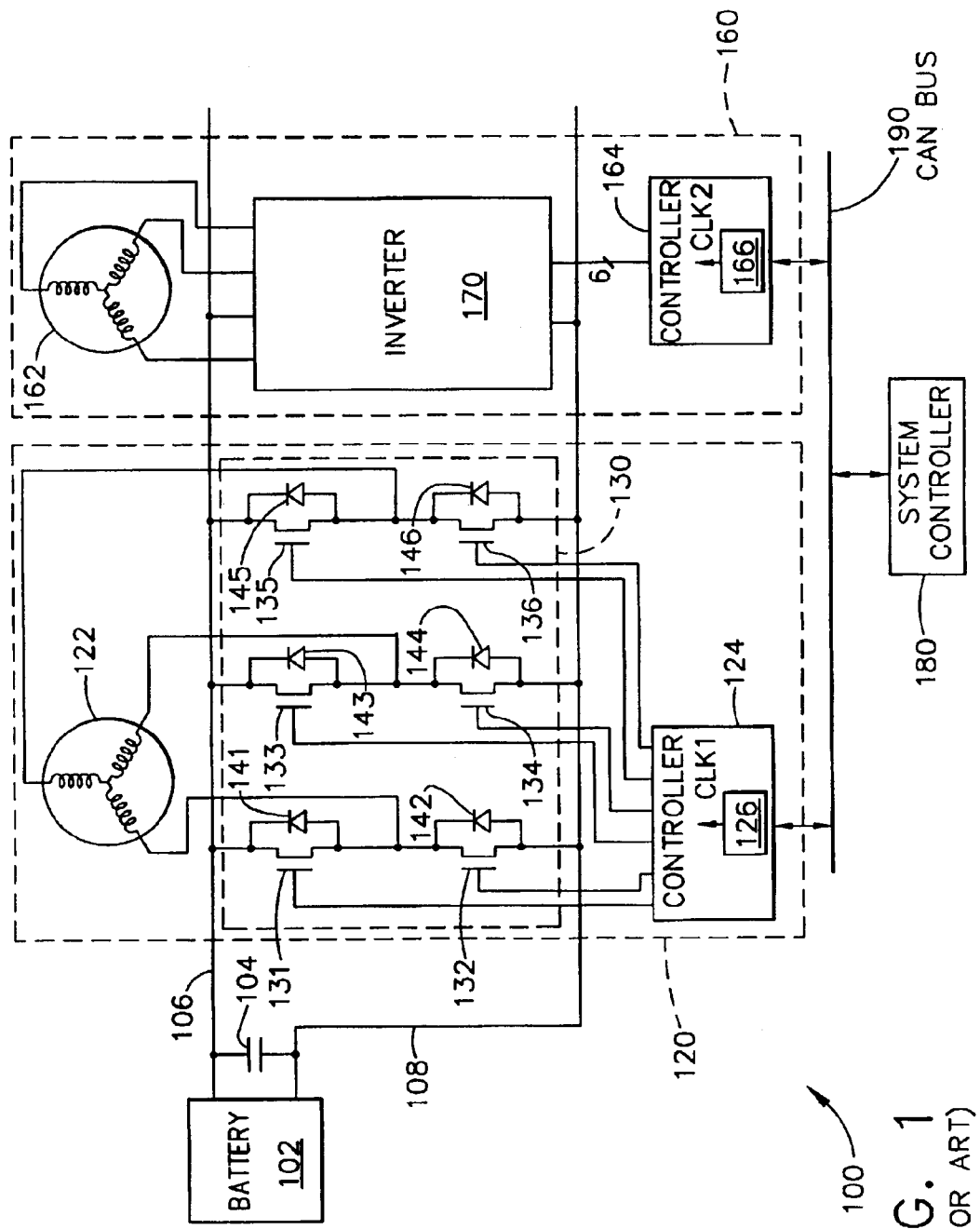
FIG. 1 illustrates a block diagram of a multiple inverter system known in the prior art.

FIG. 1 illustrates a block diagram of a multiple inverter system 100 known in the prior art. Multiple inverter system 100 includes generally a battery 102, a smoothing capacitor 104, a first motor system 120, a second motor system 160, a system controller 180, and a controller area network (CAN) bus 190. Battery 102 has a positive terminal coupled to a power bus 106 and a negative terminal coupled to a negative bus 108. Capacitor 104 has a first terminal coupled to power bus 106, and a second terminal coupled to negative bus 108. Capacitor 104 is large enough to smooth the power bus ripples caused by motor systems 120 and 160 to a sufficient degree.

Motor system 120 includes generally a motor 122, a controller 124, and an inverter 130. Motor 122 is a three-phase AC motor having three terminals connected to respective phases thereof. Controller 124 is connected to CAN bus 190 and has six output terminals for providing two drive signals associated with each of the three phases of motor 122. Controller 124 also has a clock generator circuit 126 that provides a clock signal labeled "CLK1". Controller 124 internally is implemented as a digital microcontroller with a central processing unit, memory, and input/output circuitry. The input/output circuitry includes pulse width modulator (PWM) circuitry that generates output waveforms in synchronism with CLK1 having duty cycles corresponding to the drive signals required for driving the three phases of motor 122 at the appropriate time to cause the rotor of motor 122 to turn at the desired speed or to produce the desired torque.

Inverter 130 includes six N-channel metal oxide semiconductor field effect transistors (MOSFETs) 131–136 and six protection diodes 141–146. Transistor 131 has a drain connected to power bus 106, a gate for receiving a first PWM output signal associated with a first phase of motor 122 from controller 124, and a source connected to a first phase winding of motor 122. Transistor 132 has a drain connected to the source of transistor 131, a gate for receiving a second PWM output signal associated with the first phase of motor 122 from controller 124, and a source connected to negative bus 108. Transistor 133 has a drain connected to power bus 106, a gate for receiving a first PWM output signal associated with a second phase of motor 122 from controller 124, and a source connected to a second phase winding of motor 122. Transistor 134 has a drain connected to the source of transistor 133, a gate for receiving a second PWM output signal associated with the second phase of motor 122 from controller 124, and a source connected to negative bus 108. Transistor 135 has a drain connected to power bus 106, a gate for receiving a first PWM output signal associated with a third phase of motor 122 from controller 124, and a source connected to a third phase winding of motor 122. Transistor 136 has a drain connected to the source of transistor 135, a gate for receiving a second PWM output signal associated with the third phase of motor 122 from controller 124, and a source connected to negative bus 108. Each of protection diodes 141–146 has a cathode connected to the drain of a respective one of transistors 131–136, and an anode connected to the source of a respective one of transistors 131–136. All of the discrete devices of inverter 130 are commonly combined into a single module known as a HEXPACK module.

Motor system 160 includes generally a motor 162, a controller 164, and an inverter 170. Motor 162 is also a three-phase AC motor having three terminals connected to respective phases thereof. Controller 164 is connected to CAN bus 190 and has six output terminals for providing two drive signals associated with each of the three phases of motor 162. Controller 164 also has a clock generator circuit 166 that provides a clock signal labeled "CLK2". Controller 164 internally is implemented as a digital microcontroller with a central processing unit, memory, and input/output circuitry. Like controller 124, the input/output circuitry includes PWM circuitry that generates output waveforms in synchronism with CLK2 having duty cycles corresponding to the drive signals required for driving the three phases of motor 162 at the appropriate time to cause the rotor of motor 162 to turn with the desired speed or to produce desired torque.

Inverter 170 is structurally identical to inverter 130 and has inputs for receiving two PWM phase drive signals associated with each of the three phases of motor 162. Inverter 170 is also coupled to the first and second terminals of battery 102 for receiving its operating power therefrom. Inverter 170 has three outputs connected to respective phase windings of motor 162.

System controller 180 is connected to CAN bus 190 and provides commands to controller 124 and 164. Such commands include commands to place the motor into motoring mode or regeneration mode, etc.

Both motor system 120 and motor system 160 are powered from a common energy source, namely battery 102, but are clocked by separate clock signals CLK1 and CLK2. CLK1 and CLK2 have arbitrary frequencies and are asynchronous with respect to each other. Since capacitor 104 must be sized to take into account the worst-case bus current ripple, it must have a value equal to the sum of the values that would be required for each separate motor system. If the motor systems were the same, then capacitor 104 would have twice the size that would be required by each of the motor systems by themselves.

According to the present invention, the smoothing capacitor size is reduced by considering the multiple inverter system as a whole system, and driving the motors intelligently and in a coordinated fashion in order to minimize power bus current ripple to the whole system. Generally, this coordination is achieved by two mechanisms. First, the PWM signals to drive the inverters are generated with reference to clocks having the same frequency but with modulation schemes chosen to complement each other. Second, the modulation schemes are chosen in dependence on the combined states of the motors. One modulation scheme is chosen when either both motors are in the motoring mode or both motors are in the regeneration mode. Another modulation scheme is chosen when one motor is in the motoring mode and the other is in the regeneration mode.

Figure 2:
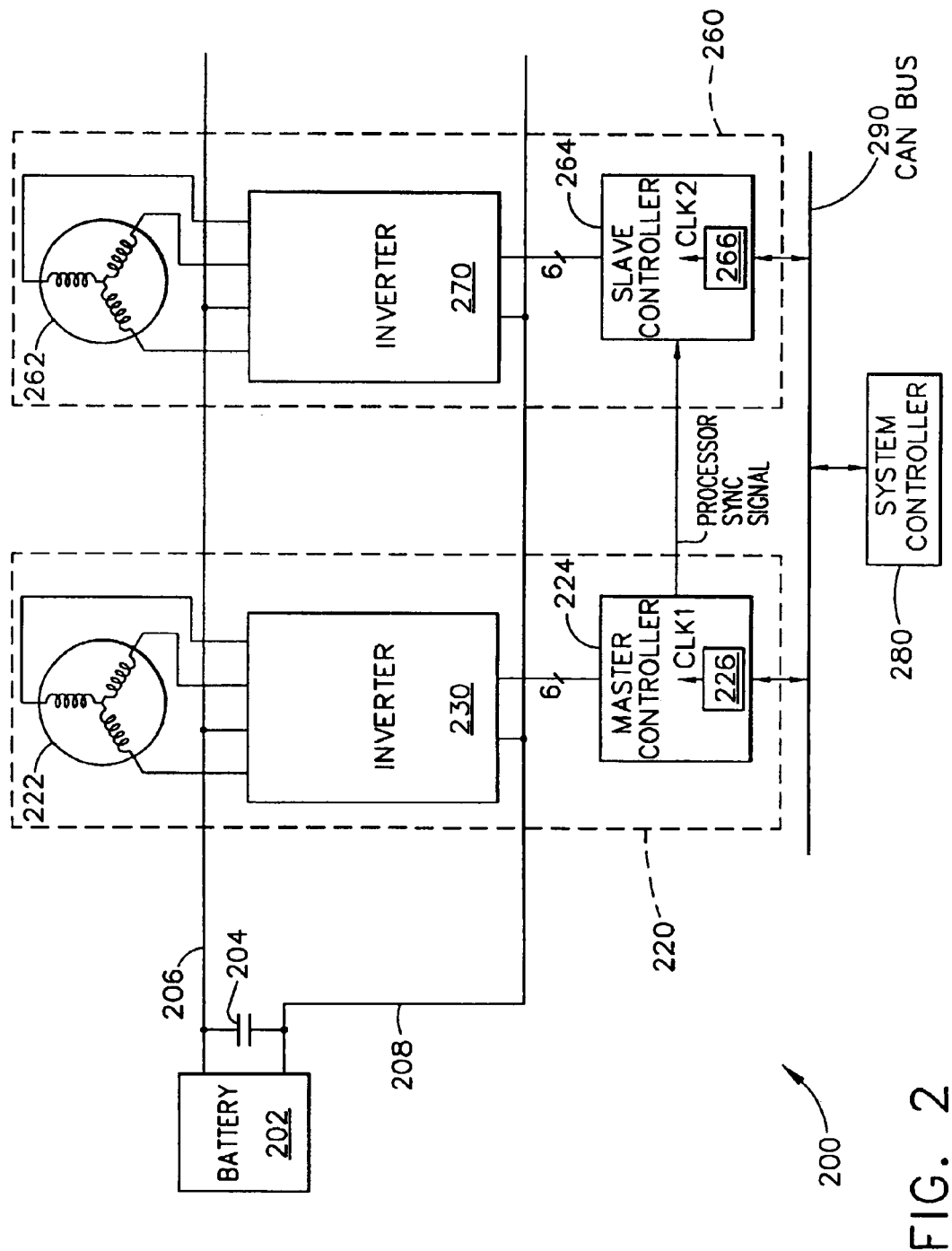
FIG. 2 illustrates a block diagram of a multiple inverter system according to the present invention.

FIG. 2 illustrates a block diagram of a multiple inverter system 200 according to the present invention. Multiple inverter system 200 includes generally a battery 202, a smoothing capacitor 204, a first motor system 220, a second motor system 260, a system controller 280, and a CAN bus 290. Battery 202 is a DC energy source implemented as battery array. For use in a hybrid vehicle, battery 202 is a low voltage, high current battery pack. Battery 202 has a positive terminal coupled to a power bus 206 and a negative terminal coupled to a negative bus 208. Battery 202 generates a nominal output voltage of about +42 volts, however the invention is applicable to batteries having other voltages as well. Capacitor 204 has a first terminal coupled to the first terminal of battery 202, and a second terminal coupled to the second terminal of battery 202. Capacitor 204 is large enough to smooth the power bus current ripple caused by motor systems 220 and 260 to a sufficient degree, and is preferably implemented as a bank of carbon capacitors having a total capacitance of about 20,000 µF.

Motor system 220 includes generally a motor 222, a master controller 224, and an inverter 230. Motor 222 is a three-phase AC motor having three terminals connected to respective phases thereof. Controller 224 is connected to CAN bus 290 and has six output terminals for providing two drive signals associated with each of the three phases of motor 222. Controller 224 internally is implemented as a digital microcontroller with a central processing unit, memory, and input/output circuitry. Like controller 124 of FIG. 1, the input/output circuitry includes PWM circuitry that generates output waveforms in synchronism with CLK1 having duty cycles corresponding to the drive signals required for driving the three phases of motor 222 at the appropriate time to cause the rotor of motor 222 to turn with the desired velocity or to produce the desired torque. Inverter 230 is structurally identical to inverter 130 of FIG. 1 and has inputs for receiving two PWM phase drive signals associated with each of the three phases of motor 222. Inverter 230 is also coupled to power bus 206 and negative bus 208 for receiving its operating power therefrom. Inverter 230 has three outputs connected to respective phase windings of motor 222.

Motor system 260 includes generally a motor 262, a slave controller 264, and an inverter 270. Motor 262 is a three-phase AC motor having three terminals connected to respective phases thereof. Controller 264 is connected to CAN bus 290 and has six output terminals for providing two drive signals associated with each of the three phases of motor 262. Controller 264 internally is implemented as a digital microcontroller with a central processing unit, memory, and input/output circuitry. Like controller 124 of FIG. 1, the input/output circuitry includes PWM circuitry that generates output waveforms in synchronism with CLK2 having duty cycles corresponding to the drive signals required for driving the three phases of motor 262 at the appropriate time to cause the rotor of motor 262 to turn with the desired velocity or to produce the desired torque. Inverter 270 is structurally identical to inverter 130 of FIG. 1 and has inputs for receiving two PWM phase drive signals associated with each of the three phases of motor 262. Inverter 270 is also coupled to power bus 206 and negative bus 208 for receiving its operating power therefrom. Inverter 270 has three outputs connected to respective phase windings of motor 262.

System controller 280 is responsive to commands received from the driver of the vehicle and provides commands to master controller 224 and slave controller 264 to control speed/torque and mode of each motor. System controller 280 uses CAN bus 290 to communicate these commands. CAN bus 290 is especially well suited to the automotive environment but in other embodiments other bus systems may be used as well.

Multiple inverter system 200 is able to reduce the size required for capacitor 204 to about half of what would be required for inverter system 100 of FIG. 1 by considering inverter systems 220 and 260 as parts of an interrelated whole system, and coordinating the generating of the pulse width modulation signals intelligently to minimize power bus ripples. To that end master controller 224 has an output labeled "PROCESSOR SYNC SIGNAL" connected to an input of slave controller 264.

Figure 3:
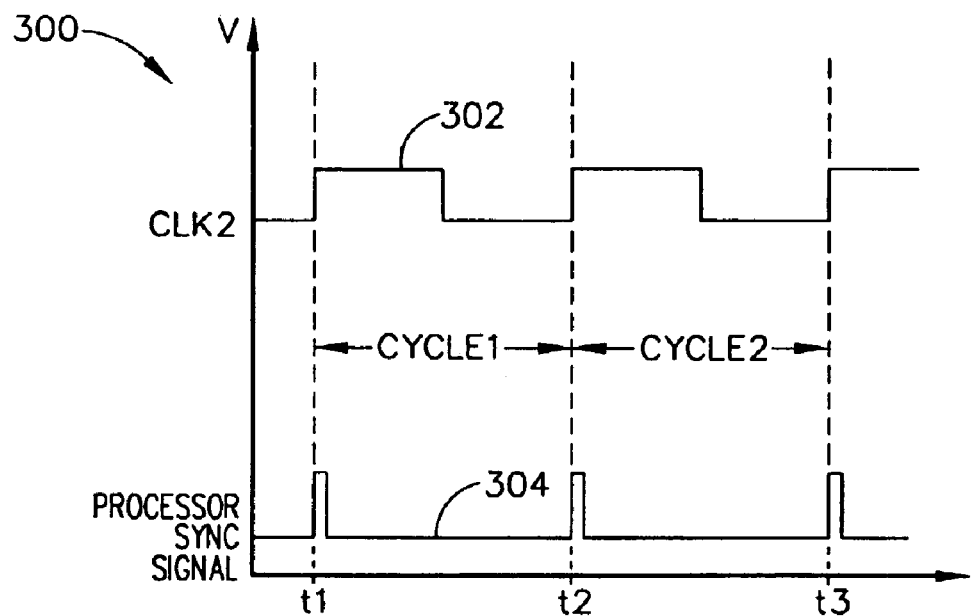
FIG. 3 illustrates a timing diagram of clock and synchronization signals of FIG. 2.

The use of the PROCESSOR SYNC SIGNAL in coordinating the operation of motor system 220 and motor system 260 is better understood with respect to FIG. 3, which illustrates a timing diagram 300 of clock and synchronization signals of FIG. 2. In FIG. 3 the horizontal axis represents time, whereas the vertical axis represents voltage. Clock signal CLK2 is illustrated by a waveform 302 that begins a cycle by changing from a logic low voltage to a logic high voltage at time points labeled "t1", "t2", and "t3". As shown here CLK2 has a fifty percent duty cycle and thus transitions to a logic low voltage midway between t1 and t2, and t2 and t3. PROCESSOR SYNC SIGNAL is illustrated by a waveform 304 that briefly pulses high at t1, t2, and t3. Thus, in FIG. 3 a first cycle for slave controller 264 labeled "CYCLE 1" begins at t1 and ends at t2, and a second cycle labeled "CYCLE 2" begins at t2 and ends at t3. PROCESSOR SYNC SIGNAL is derived from the master controller 224 internal clock CLK1. Therefore, through PROCESSOR SYNC SIGNAL, master controller 224 is able to ensure the PWM signals are generated with the same period and beginning at a known point in time. System 200 then uses this coordination to minimize power bus ripples as described more fully below.

Figure 4:
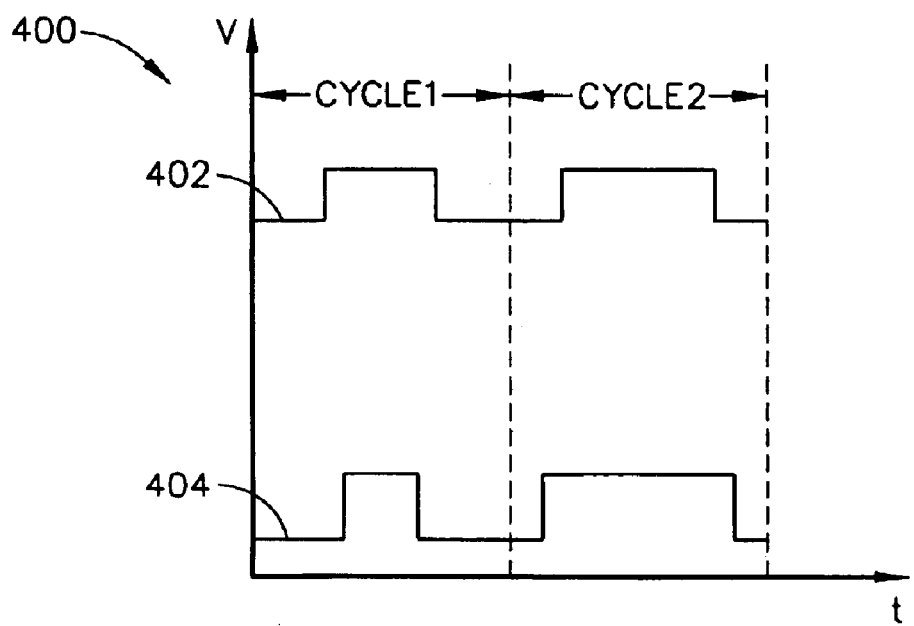
FIG. 4 illustrates a timing diagram of drive signals in the inverter system of FIG. 2 generated according to a first method.

The inventors analyzed three different modulation schemes for intelligently generating the PWM signals to inverters 230 and 270. In all these three schemes, the PWM cycles of each inverter is synchronized with each other. The first scheme is known as center based coincident. FIG. 4 illustrates a timing diagram 400 of PWM signals used in the system of FIG. 2 according to this method. A first PWM signal 402 is associated with one of the phases of motor system 220 and is shown during two clock cycles labeled "CYCLE 1" and "CYCLE 2". During CYCLE 1, PWM signal 402 has a drive high time centered about the center of the clock cycle and has a duty cycle of about 50%. During CYCLE 2, the duty cycle of signal 302 has increased to about 66%, but signal 402 is still centered about the center of CYCLE 2.

At the same time, slave controller 264 is providing a drive signal 404 to drive one of the phases of motor 262 through inverter 270 in motor system 260. Using this technique, the clock signals are synchronized to each other and thus CYCLE 1 and CYCLE 2 are coincident. During CYCLE 1, drive signal 404 has a duty cycle of approximately 25% and is centered about the center of its cycle. As such, the drive high times of signals 402 and 404 overlap during the middle of CYCLE 1. Later, during CYCLE 2, the duty cycle of signal 404 has increased to approximately 80%.

Figure 5:
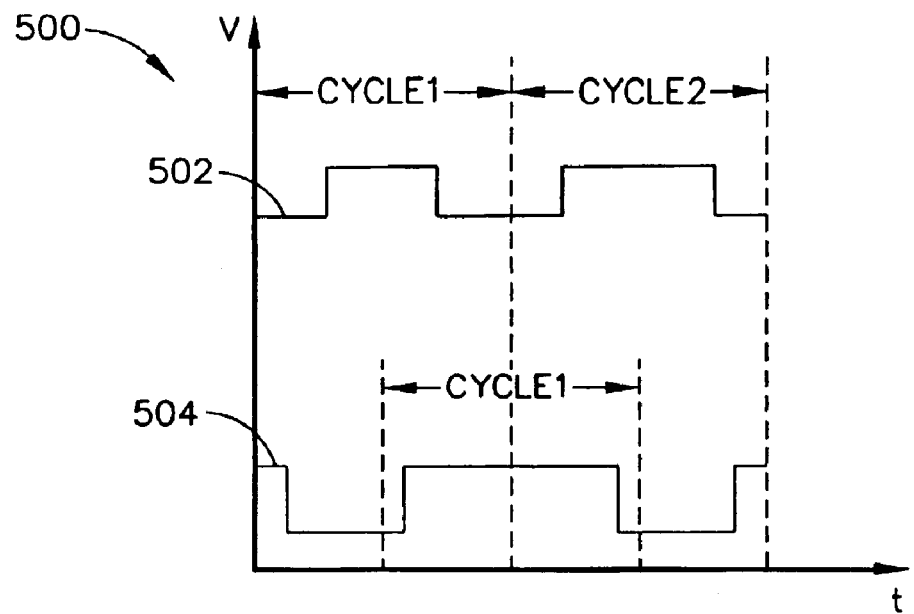
FIG. 5 illustrates a timing diagram of drive signals in the inverter system of FIG. 2 generated according to a second method.

The second scheme is known as center based interleaved. FIG. 5 illustrates a timing diagram 500 of drive signals in the inverter system of FIG. 2 generated according to this method. As in FIG. 4, a first PWM signal 502 is associated with motor system 220 and a second PWM signal 504 is associated with motor system 260. In this technique, the clock signals are interleaved, i.e., they are synchronized but out of phase with respect to each other. FIG. 5 shows that using the interleaved scheme the signal overlap is reduced compared to the center based coincident scheme.

Figure 6:
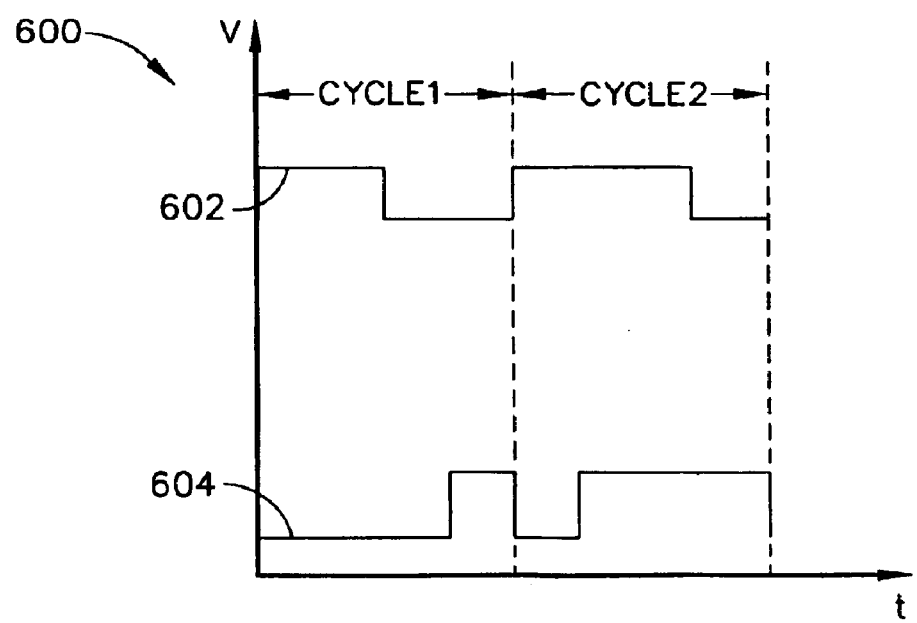
FIG. 6 illustrates a timing diagram of drive signals in the inverter system of FIG. 2 generated according to a third method.

The third scheme is known as leading and lagging edge coincident. FIG. 6 illustrates a timing diagram 600 of PWM signals used in the system of FIG. 2 according to this method. Using this scheme, CYCLE 1 and CYCLE 2 are again coincident for PWM signals 602 and 604 but because the duty cycles are modulated from different clock edges, the overlap is also reduced compared to the center based coincident scheme.

The inventors simulated these three schemes to determine which method is preferred. Two induction machines were used. Both machines were operated in the motoring mode with a motor shaft torque of 92.5 Newton-meters (N-m). In all three schemes, the zero vector was selected such that the phase with the maximum current was not switched.

Power bus current was first compared for each of the three schemes. This analysis showed that the center based coincident scheme is undesirable when both machines are motoring. Using this scheme, the bus current from the two motors overlap each other. Although the total average current for this scheme will be the same as for the other two schemes, the root-mean-square (RMS) ripple current for the center based coincident scheme is very high due to high bus current peaks for total bus current. For a rotation speed of 500 revolutions per minute (rpm), the RMS ripple current for the center based interleaved scheme and the leading and lagging edge coincident scheme were significantly less than for the center based coincident scheme.

As a further measure of merit, the inventors analyzed the harmonic spectra of the DC bus current for the center based interleaved scheme and the leading and lagging edge coincident scheme. The center based interleaved scheme was found to have a dominant double switching frequency component, that is, energy in the harmonic spectrum peaking at about 20 kilohertz (kHz) when the switching frequency is 10 kHz. The leading and lagging edge coincident scheme was found to have a dominant switching frequency component, that is, energy in the harmonic spectrum peaking at the switching frequency of 10 kHz.

The simulated power bus current results are summarized in TABLE I below:

dent scheme produced a low frequency oscillation at around 260 Hz, or approximately six times the stator frequency for an axle speed of 500 rpm. The presence of this low frequency component is highly undesirable.

However, this low frequency component can be eliminated if the PWM edge selection is alternated between sectors. This alternation cannot be achieved unless the two machines are operating with the same stator frequency. The low frequency oscillation can also be eliminated if either the zero vector "0" or the zero vector "7" is selected in all the sectors. By doing this selection, the low frequency torque ripple component is greatly reduced. However, this scheme will increase the switching loss compared to the center based interleaved scheme. If MOSFETs are used as the switching devices, as in the illustrated low voltage system, switching time is very fast and the additional switching loss will not be very significant.

These simulation results analyzed the condition when both motors were in the motoring mode, but apply equally when both motors are generating. However, as an additional aspect of the present invention, the modulation scheme may be varied based on the mode of the motor system. For example, if both motor 222 and motor 262 are in the motoring mode or both are in the regeneration mode, then either the center based interleaved scheme or the leading and lagging edge coincident scheme may be used to reduce power bus current ripple. If, however, one motor is in the motoring mode and the other motor is in the regeneration mode, then it is preferable to use the center based coincident scheme since the drive currents will be opposite.

While the invention has been described in the context of a preferred embodiment, various modifications will be

TABLE I

| | Scheme 1 | | | Scheme 2 | | | Scheme 3 | | |
|---|---|---|---|---|---|---|---|---|---|
| Speed (rpm) | Average Current (A) | Total RMS Current (A) | Single PIM RMS Current (A) | Average Current (A) | Total RMS Current (A) | Single PIM RMS Current (A) | Average Current (A) | Total RMS Current (A) | Single PIM RMS Current (A) |
| 100 | 86.0 | 222.0 | 111.6 | 85.0 | 132.9 | 111.3 | 81.0 | 134.0 | 108.9 |
| 200 | 139.0 | 251.3 | 126.3 | 136.9 | 117.2 | 126.6 | 134.4 | 117.7 | 124.7 |
| 300 | 190.0 | 258.0 | 129.4 | 187.6 | 65.0 | 130.5 | 186.1 | 65.1 | 129.0 |
| 400 | 242.9 | 241.7 | 121.3 | 239.1 | 90.9 | 123.6 | 240.4 | 91.0 | 121.5 |
| 500 | 304.7 | 322.6 | 161.6 | 300.6 | 115.5 | 164.0 | 301.2 | 113.6 | 161.5 |
| 600 | 370.0 | 368.4 | 185.0 | 369.2 | 146.7 | 186.5 | 368.8 | 146.5 | 184.8 |
| 700 | 431.1 | 399.7 | 200.5 | 432.0 | 173.9 | 201.5 | 431.4 | 170.1 | 200.0 |

As can be seen from TABLE I, the total RMS current for either scheme 2 (center based interleaved) or scheme 3 (leading and lagging edge coincident) is significantly less than that for scheme 1 (center based coincident). The lower bus current ripple will significantly lower the bus voltage ripple. The different harmonic spectra in the DC bus current will also affect the selection of capacitor 204. For the same amount of capacitance, the higher spectral frequencies in scheme 2 will result in lower peak-to-peak power bus voltage ripple. However, the higher frequency components in scheme 2 will affect the capacitance electrostatic resistance (ESR) adversely, resulting in higher losses in the capacitor that will be dissipated as heat.

Next, the inventors analyzed the effects of the two schemes on torque production. They found that peak-to-peak torque ripple in response to a step torque command is higher for the leading and lagging edge coincident scheme than for the center based interleaved scheme. The inventors also found from an analysis of the harmonic spectrum of torque production that the leading and lagging edge coinciapparent to those skilled in the art. For example, the illustrated embodiment was a system having two three-phase motors. However, the invention is applicable to any motor driven by PWM signals, and is applicable to systems having two or more motors. Also, the disclosed bus ripple reduction technique is advantageous for various inverter designs, such as those built using MOSFETs as well as those built using insulated gate bipolar transistors (IGBTs). Furthermore, the preference between the center-based interleaved scheme and the leading and lagging edge coincident scheme will vary based on the actual characteristics of the motor systems being considered. Accordingly, it is intended by the appended claims to cover all modifications of the invention that fall within the true scope of the invention.

What is claimed is:

1. A multiple inverter system for a vehicle comprising:
   an energy source;
   a capacitor coupled in parallel to said energy source;
   a first inverter coupled to said energy source and adapted to drive a first motor, a first controller having an output coupled to said first inverter for providing a first pulse width modulated signal thereto that is modulated in relation to a first clock signal;

a second inverter coupled to said energy source and adapted to drive a second motor, and a second controller having an input for receiving a synchronization signal, and an output coupled to said second inverter for providing a second pulse width modulated signal thereto that is modulated in relation to a second clock signal, wherein said second controller uses said synchronization signal to generate said second clock signal having a predetermined relationship with respect to said first clock signal;

wherein said first and second clock signals are synchronized with respect to each other; and wherein said first pulse width modulated signal is leading edge modulated with respect to said first clock signal and said second pulse width modulated signal is lagging edge modulated with respect to said second clock signal.

2. The multiple inverter system of claim 1 wherein said first and second clock signals are interleaved with respect to each other.

3. The multiple inverter system of claim 2 said first pulse width modulated signal is center based modulated with respect to said first clock signal and said second pulse width modulated signal is center based modulated with inspect to said second clock signal.

4. The multiple inverter system of claim 1 wherein said energy source comprises a battery.

5. The multiple inverter system of claim 1 wherein said capacitor is implemented as a bank of carbon capacitors.

6. The multiple inverter system of claim 1 wherein said first controller is characterized as being a master controller and said second controller is characterized as being a slave controller, and wherein said first controller further has an output for providing said synchronization signal to an input of said second controller.

7. The multiple inverter system of claim 1 further comprising a system controller coupled to said first and second controllers via a bus, for controlling a mode of operation of said first and second controllers.

8. A method for reducing the power bus ripples of a multiple inverter system comprising the steps of:

powering first and second inverters respectively coupled to first and second motors from a common power source;

generating a first pulse width modulated signal that is modulated in relation to a first clock signal;

driving said first inverter with said first pulse width modulated signal;

generating a second pulse width modulated signal that is modulated in relation to a second clock signal;

driving said second inverter with said second pulse width modulated signal; and generating said first and second clock signals having a predetermined relationship with respect to each other;

wherein said step of generating said first and second clock signals comprises the step of synchronizing said first and second clock signals; and wherein said step of generating said first pulse width modulated signal comprises the step of modulating said first pulse width modulated signal around a leading edge of said first clock signal, and wherein said step of generating said second pulse width modulated signal comprises the step of modulating said second pulse width modulated signal around a lagging edge of said second clock signal.

9. The method of claim 8 wherein said step of driving said first inverter comprises the step of driving said first inverter using a master controller, wherein said step of driving said second inverter comprises the step of driving said second inverter using a slave controller, and wherein the step of generating said first and second clock signals having said predetermined relationship with respect to each other comprises the step of providing a synchronization signal from said master controller to said slave controller.

10. The method of claim 8 wherein said step of providing said first and second clock signals comprises the step of interleaving said first and second clock signals.

11. The method of claim 10 wherein said step of generating said first pulse width modulated signal comprises the step of modulating said first pulse width modulated signal around a center of said first clock signal and wherein said step of generating said second pulse width modulated signal comprises the step of modulating said second pulse width modulated signal around a center of said second clock signal.

12. The method of claim 8 further comprising the step of smoothing power bus ripples of said common power source using a capacitor.

13. A method for reducing the power bus ripples of a multiple inverter system comprising the steps of:

powering first and second inverters respectively coupled to first and second motors from a common energy source;

driving said first inverter using a first pulse width modulation signal;

driving said second inverter using a second pulse width modulation signal;

generating said first and second pulse width modulation signals using the same modulation scheme when one of said first and second motors is in a motoring mode and the other one of said first and second motors is in a regeneration mode; and generating said first and second pulse width modulation signals using different modulation schemes when either, both said first and second motors are in said motoring mode, or both said first and second motors are in said regeneration mode.

14. The method of claim 13 wherein said step of generating said first and second pulse width modulation signals using the same modulation scheme comprises the step of generating said first and second pulse width modulation signals using coincident center-based modulation.

15. The method of claim 13 wherein said step of generating said first and second pulse width modulation signals using different modulation schemes comprises the step of generating said first pulse width modulation signal using center based modulation with respect to a first clock signal and generating said second pulse width modulation signal using center based modulation with respect to a second clock signal that is interleaved with said first clock signal.

16. The method of claim 13 further comprising the step of placing said first and second motors into selected ones of said motoring mode and said regeneration mode using a common system controller.

* * * * *